United States Patent
Yang et al.

(10) Patent No.: US 10,299,163 B2
(45) Date of Patent: May 21, 2019

(54) ENHANCEMENT ON HEADER COMPRESSION

(71) Applicant: MEDIATEK INC., Hsin-Chu (TW)

(72) Inventors: Zhu-Jun Yang, Xihu Township (TW);
Yi-Shing Liou, Jiji Township (TW);
Chih-Heng Shih, Taichung (TW);
Yu-Cheng Chen, Jhubei (TW);
Yu-Ting Yao, Tainan (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/630,655

(22) Filed: Jun. 22, 2017

(65) Prior Publication Data

US 2018/0014225 A1    Jan. 11, 2018

Related U.S. Application Data

(60) Provisional application No. 62/358,187, filed on Jul. 5, 2016.

(51) Int. Cl.
| | | |
|---|---|---|
| *H04W 28/06* | (2009.01) | |
| *H04L 29/06* | (2006.01) | |
| *H04W 28/02* | (2009.01) | |

(52) U.S. Cl.
CPC ............. *H04W 28/06* (2013.01); *H04L 69/04* (2013.01); *H04L 69/22* (2013.01); *H04W 28/0215* (2013.01)

(58) Field of Classification Search
CPC .... H04L 69/04; H04L 69/22; H04W 28/0215; H04W 28/06
See application file for complete search history.

(56) References Cited

U.S. PATENT DOCUMENTS

| | | | |
|---|---|---|---|
| 2006/0013235 A1 | 1/2006 | Farnham | |
| 2014/0195498 A1* | 7/2014 | Asher | H03M 7/4037 707/693 |
| 2014/0347331 A1* | 11/2014 | Amit | G09G 5/00 345/204 |
| 2015/0085876 A1 | 3/2015 | Chhatriwala et al. | |
| 2015/0117460 A1 | 4/2015 | Persson et al. | |
| 2015/0371400 A1* | 12/2015 | Farsiu | G06T 7/0012 382/128 |
| 2016/0127513 A1* | 5/2016 | Fallon | H04L 12/1895 709/247 |

(Continued)

FOREIGN PATENT DOCUMENTS

CN        102833785 A     12/2012

OTHER PUBLICATIONS

Combined Office Action and Search Report dated Mar. 28, 2018 in Taiwanese Patent Application No. 106122203 (with English translation of categories of cited documents) citing references AA—AC and AO therein, 12 pages.

*Primary Examiner* — Brian D Nguyen
(74) *Attorney, Agent, or Firm* — Oblon, McClelland, Maier & Neustadt, L.L.P.

(57) ABSTRACT

Aspects of the disclosure provide a method for packet header compression. The method can include receiving a packet in a communication device having resources for packet compression, parsing a header of the packet to obtain header information, and determining whether to compress the header of the packet based on the header information and status of the resources for packet compression in the communication device.

20 Claims, 5 Drawing Sheets

(56) References Cited

U.S. PATENT DOCUMENTS

2016/0309363 A1\* 10/2016 Persson ................... H04L 69/04
2017/0091381 A1\* 3/2017 Fernandez-Gomez ......................
  G01N 33/48721

\* cited by examiner

ENHANCEMENT ON HEADER COMPRESSION

INCORPORATION BY REFERENCE

This present disclosure claims the benefit of U.S. Provisional Application No. 62/358,187, "Enhancement on ROHC Compressor" filed on Jul. 5, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Header compression mechanisms can be employed to compress packet traffics to save bandwidth over bandwidth limited links. However, header compression can be computational intensive, and a mobile device may not have enough resources to compress all of the packets received at a header compressor.

SUMMARY

Aspects of the disclosure provide a method for packet header compression. The method can include receiving a packet in a communication device having resources for packet compression, parsing a header of the packet to obtain header information, and determining whether to compress the header of the packet based on the header information and status of the resources for packet compression in the communication device.

A first embodiment of the method can include processing the packet without header compression when a level of a resource for packet compression is below a threshold. A second embodiment of the method can include determining whether to compress the header of the packet based on content of the header when a level of a resource for packet compression is below a threshold. A third embodiment of the method can include compressing the header of the packet when a level of a resource for packet compression is below a threshold, and a packet compression ratio of the packet is above a threshold. In one example, the resources for header compression in the communication device include one of central processing unit (CPU) time of a CPU, memory for storage of compressed headers, or battery energy.

In an embodiment, the method can further include assigning a context reuse priority to a compression context established for the packet. The reuse priority assigned to the compression context can be determined based on a traffic pattern, header content, or a packet compression ratio of a packet flow including the packet. In one example, the method further includes selecting an existing compression context for context reuse for the packet based on context reuse priorities assigned to existing compression contexts. In one example, the method further includes determining a context reuse priority for the packet, and processing the packet without header compression when the context reuse priority of the packet is higher than context reuse priorities of existing compression contexts.

Aspects of the disclosure provide a communication device. The communication device includes circuitry configured to receive a packet, parse a header of the packet to obtain header information, and determine whether to compress the header of the packet based on the header information and status of resources for packet compression in the communication device.

Aspects of the disclosure provide a non-transitory computer readable medium having computer readable instructions stored thereon. The computer readable instructions, when executed by a processing circuit, cause the processing circuit to perform the method for header compression.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
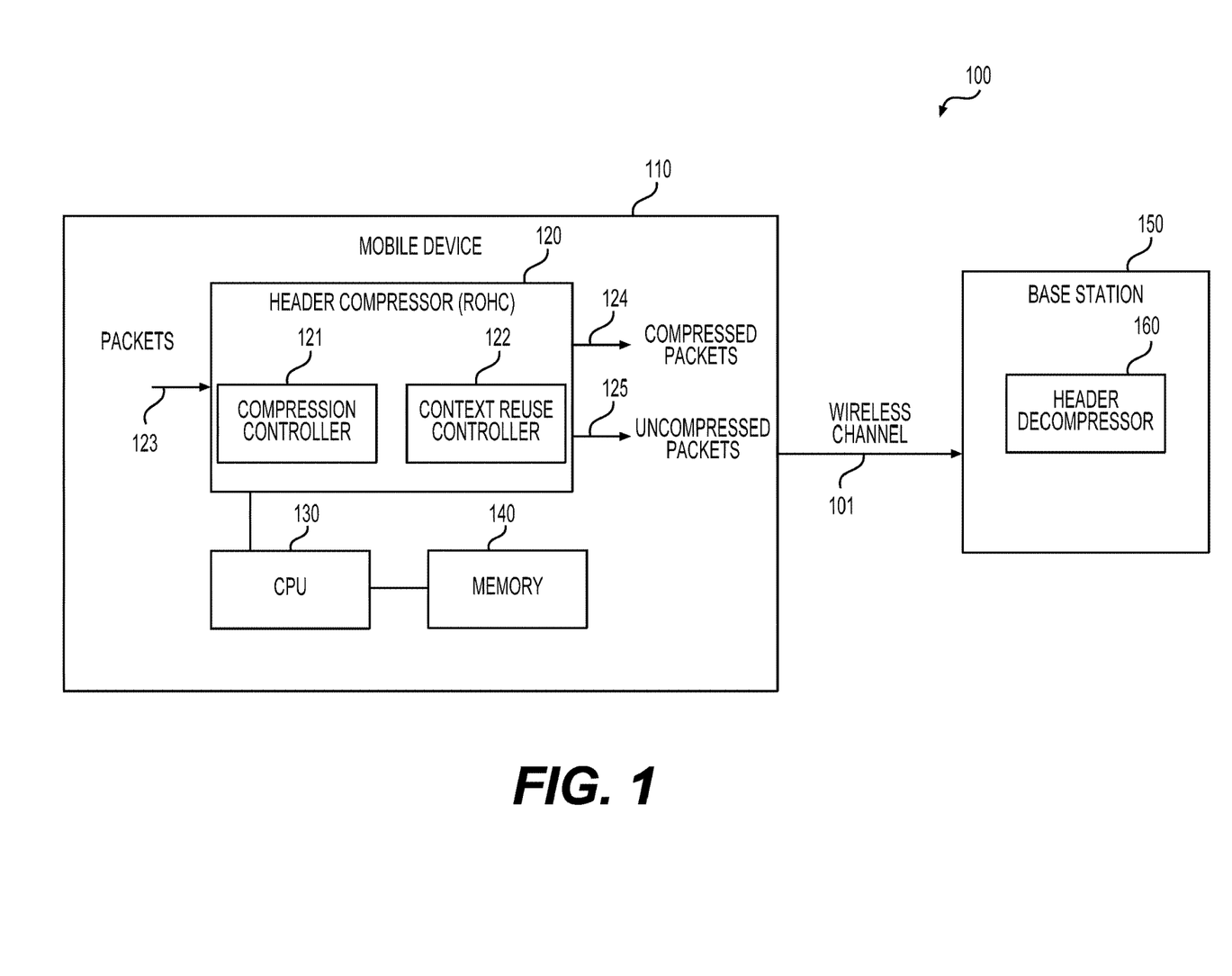
FIG. 1 shows a wireless communication network according to an embodiment of the disclosure.

FIG. 1 shows a wireless communication network 100 according to an embodiment of the disclosure. The wireless communication network 100 can include a mobile device 110 and a base station 150. The mobile device 110 can include a header compressor 120, a central processing unit (CPU) 130, and a memory 140. The base station 150 can include a header decompressor 160. Those components are coupled together as shown in FIG. 1. The wireless communication network 100 can be a cellular network, a wireless local area network (WLAN), and the like. The mobile device 110 can communicate with the base station 150 through a wireless communication channel 101 according to communication protocols specified in various communication standards, such as the Long-Term Evolution (LTE) standards developed by the 3rd Generation Partnership Project (3GPP), and the IEEE 802.11 standards developed by the Institute of Electrical and Electronics Engineers (IEEE).

The mobile device 110 can be a mobile phone, a laptop computer, a tablet computer, and the like. The mobile device 110 can employ one of various header compression schemes to compress packet traffics to save bandwidth for transmission over the wireless channel 101. For example, applications on the mobile device 110 can maintain a plurality of sessions, such as TCP, UDP or RTP sessions, simultaneously. Packet flows corresponding to those sessions are generated and processed by the mobile device 110. Headers of packets in each packet flow include redundant information. For example, there is redundancy between header field values within packets, and in particular, between consecutive packets belonging to a same packet flow. Accordingly, header sizes can be reduced by compression performed on packet headers.

For example, a combined header of a packet in an audio stream with IPv4 can include a 20-byte IPv4 header, an 8-byte UDP header, and a 12-byte RTP header, resulting in a header of 40 bytes. In one example, each packet can carry a payload of 33-byte compressed audio data. Accordingly, the header accounts for 55% of the packet. By employing a header compression scheme, the header can be compressed from 40 bytes to 1 byte achieving a significant bandwidth saving.

The header compressor 120 is configured to perform header compression based on one of various header compression schemes. For example, when a radio bearer is initialized for transmission of a packet flow from an application at the mobile device 110, the radio bearer can be configured to use or not use header compression function. When header compression function is configured for the radio bearer, the packet flow is directed to the header compressor 120 and headers of the packet flow can be compressed. In one example, the header compressor 120 employs robust header compression (ROHC) to perform the header compression function. ROHC is a header compression scheme defined by IETF RFC 3095.

In one example, the header compressor 120 can dynamically control amount of packets to be compressed at the header compressor 120 according to status of resources used for header compression. Resources required for header compression may include CPU power, memory, power supply, and the like, and can vary during a lifetime of a packet flow. When there are not enough resources available for header compression, the header compressor 120 can reduce the amount of packets directed to header compression processing, or stop directing packets to header compression processing. Instead, the header compressor 120 can bypass the header compression processing and deliver packets received at the header compressor 120 without performing compression on the packets. In this way, dropping of packets can be avoided when resources needed for header compression are exhausted.

Specifically, the header compressor 120 can include a compression controller 121. The compression controller can be configured to determine whether to compress a packet based on resource status information. For example, packets 123 of different packet flows are received at the header compressor 120, and header information can be extracted and provided to the compression controller 121. When a resource level is below a threshold, the compression controller 121 can be triggered to perform the control function. In a first example, the compression controller 121 can make a decision of whether to compress a packet header based on header information of this header. Different packets may thus be treated differently according to configurations. Alternatively, in a second example, the compression controller 121 may decide not to perform compression on any received packets for a period of time until resource status improves. As a result, compressed packets 124 or uncompressed packets 125 can be generated from the header compressor 120.

The header compressor 120 can further include a context reuse controller 122 configured to perform a context reuse function. For example, a context can be established for each packet flow and maintained at both the header compressor 120 and the header decompressor 160. Contexts can be included in a context table. The context can contain relevant information from previous headers in the respective packet flow. The relevant information can be used to compress and decompress subsequent packets. For example, the relevant information can include static field values of packets, and possible reference values for compression and decompression. Moreover, additional information describing the packet flow can be also part of the context, such as information about a change behavior of dynamic fields of packets (e.g., the IP identifier behavior, or the typical inter-packet increase in sequence numbers and timestamps). The context is synchronized between the header compressor 120 and the header decompressor 160. When the context of the header decompressor 160 is not consistent with the context of the header compressor 120, decompression may fail to reproduce an original header.

In one example, a maximum number of contexts that can be maintained at both the header compressor 120 and the header decompressor 160 is determined based on negotiations between the header compressor 120 and the header decompressor 160. In one example, the network 100 is an LTE network, and the maximum number of contexts the mobile device 110 can maintain is determined by the base station 150 according to configurations of the LTE network. During compression operations, when an amount of active sessions becomes larger than the maximum number of contexts, the context reuse controller 122 is triggered to make a context reuse decision.

For example, the context reuse controller 122 can maintain a context reuse table. The context reuse table can include a list of context IDs (CID each associated with a reuse priority. The reuse priority is determined and assigned to a respective context by the context reuse controller 122 when the context is initialized. When a packet is received at the header compressor 120, no context matching the packet is found in the context table, and an amount of established contexts has reached the limitation of the maximum number, the context reuse controller 122 may be triggered to initiate a context reuse procedure. For example, the context reuse controller 122 can select an existing context having the highest reuse priority in the context table, and reuse the OD of this context to establish a new context for the received packet. The context with the highest priority is substituted with the newly established context.

In a conventional context reuse procedure, a context that is created the earliest among contexts in a context table is selected to be reused. As packets of multiple packet flows intermix with each other and arrives at the header compressor 120 sequentially, ping-pong context replacement may take place while context reuse operations are being performed. A context of a packet flow can be repeatedly established and subsequently removed in the context table as a result of context reuse operations. A context newly established at a compressor needs to be updated to a counterpart decompressor. The updating operation can reduce header compression efficiency. When priority-based context reuse scheme is employed, frequently establishing and removing a context can be avoided, thus improving compression efficiency.

The processed packets, including the compressed packets 124 and the uncompressed packets 125, can be further processed (e.g., layer 2 and layer 1 processing in a typical communication protocol stack) and transmitted to the base station 150 over the wireless channel 101. The header decompressor 160 receives the packets 124 and 125, for example, from lower layer components in a typical communication protocol stack, and recovers original packets 123. For example, the compressed packets 124 can be decompressed with reference to respective contexts.

In one example, the header compressor 120 is implemented with program instructions, and the CPU 130 is configured to execute the program instructions to perform functions of the header compressor 120. In addition, computing power of the CPU 130 can be shared between the header compressor 120 and other functions of the mobile device 110. For example, the other functions may include control plane signaling processing for establishment and maintenance of radio links between the mobile device 110 and the base station 150, and processing of packets from applications that are not directed to the header compressor 120. CPU resources available for header compression can vary due to variations of workload introduced by various functions. In worst cases, CPU power assigned to header compression may not be sufficient for header compression processing. Accordingly, header compression processing may have to be limited to match an available-resource level.

The memory 140 can include transitory storage media, such as a random access memory (RAM), or non-transitory storage media, such as a read-only memory, a solid state drive, and a hard-disk drive. The memory 140 can be configured to store program instructions of the header compressor 120, or data generated during header compression operations. Additionally, the memory 140 can be configured to store program instructions and data of other functional components of the mobile device 110 which can include application programs, operating system programs, programs for communication protocol processing, and the like.

It is to be understood that the mobile device 110 can include other components, such as input and output devices, additional signal processing circuitry (e.g., baseband signal processing circuitry), a radio frequency module, and the like, that enable the mobile device 110 to operate properly in various examples. It is noted that the mobile device 110 and the base station 150 can respectively include a header decompressor and a header compressor operating cooperatively, such that header compression functions described herein can be performed on packets transmitted from the base station 150 to the mobile device 110. Furthermore, while the mobile device 110 in the wireless communication network 100 is used as an example for explanation of inventive header compression schemes, it is to be understood that the inventive header compression schemes described herein are also applicable to packet transmissions in wired systems or fixed devices wirelessly connected to a wireless communication network.

Figure 2:
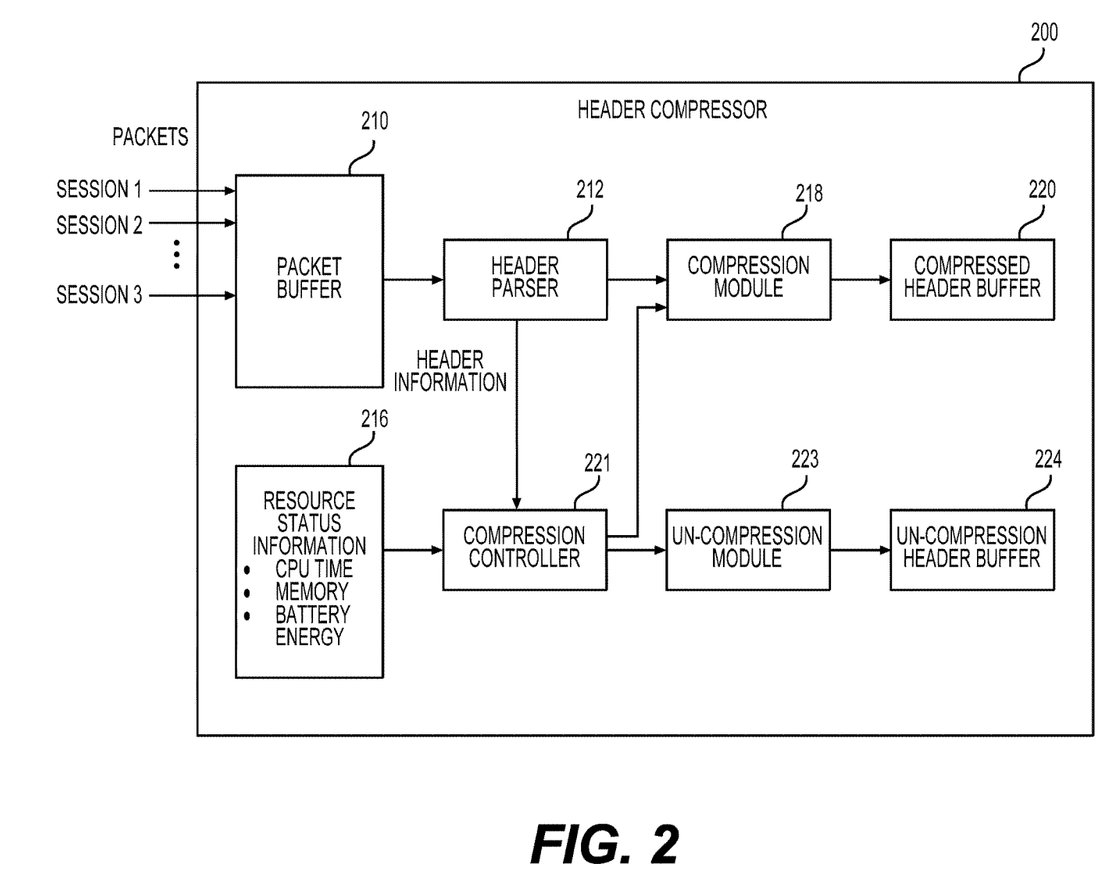
FIG. 2 shows a header compressor according to an embodiment of the disclosure.

FIG. 2 shows a header compressor 200 according to an embodiment of the disclosure. The header compressor 200 is an example of the header compressor 120 but with more details. The header compressor 200 is configured to adjust an amount of packets directed to header compression processing according to status of resources required for header compression. In addition, the header compressor 200 is configured to conduct context reuse based on reuse priorities of established contexts. In one example, the header compressor 200 includes a packet buffer 210, a header parser 212, a compression controller 221, a compression module 218, a compressed header buffer 220, an un-compression module 223, and an un-compression header buffer 224.

The packet buffer 210 stores packets received from applications. As an example, communication sessions 1-m are shown in FIG. 2 that are set up for the applications. The header parser 212 receives packet headers from the packet buffer 210, and extracts header information from the packet headers. The extracted header information is provided to the compression controller 221.

The compression controller 221 receives resource status information 216 and determines whether to limit the amount of packets directed to compression processing based on the resource status information 216. The resource status information 216 shows status of one or more resources required for header compression. In one example, the resource status information 216 includes status information of the following resources: CPU time, memory, and battery energy.

For example, in typical wireless communication networks, control data or user data is processed and transmitted based on a transmission time interval (TTI), such as a TTI of 1 ms in an LTE network. The CPU 130 in FIG. 1 example needs to complete preparation of data to be transmitted for each TTI. Within a time period of TTI, the CPU 130 is shared by multiple tasks. The CPU 130 may be occupied by other tasks with higher priorities before becoming available for header compression operations. Information about the amount of available CPU time for header compression within a TTI can be obtained, for example, by checking a clock when the CPU becomes available for header compression.

The header compressor 200 can employ multiple memories for header compression processing, such as the packet buffer 210 that stores packet payloads and un-compressed packet headers, and the compressed header buffer 220 that stores compressed packet headers. In some occasions, for example, in an LTE network, when transmission resources assigned by the base station 150 is not sufficient for transmission compressed packets, the compressed packets (the compressed headers and respective payloads) can be accumulated at the packet buffer 210 and the compressed header buffer 220. In worst cases, the memories can be exhausted, and packets may have to be dropped. The amount of available memories can be monitored, and information of available memories can be provided to the compression controller 221.

In addition, the mobile device 100 can include a battery. Battery energy level can be monitored by a power control circuitry in the mobile device. Battery level information can be provided to the compression controller 221.

Based on header information received from the header parser 212 and resource status information 216, the compression controller 221 can dynamically determine whether to compress a packet header, or process a packet without header compression. Specifically, when levels of available resources are above respective thresholds, the compression controller 221 may not interfere in the header compression process conducted by the header compressor 200. For example, header information of a header of a packet can be extracted by the header parser 212 and provided to the compression module 218. The compression module 218 can then determine a context for the header based on the header information. Subsequently, the header compression module 218 can compress the header to generate a compressed header using the determined context. The resultant compressed header can be stored to the compressed header buffer 220. Finally, the compressed header can be combined with a payload of the packet stored in the packet buffer 210, resulting in a compressed packet.

When a level of an available resource for header compression is below a threshold, the compression controller 221 can start to adjust the amount of packet headers that are to be compressed. For example, when CPU time assigned for header compression is below a threshold, an available buffer space of the compressed header buffer 220 is below a threshold, or a battery energy level is below a threshold, the compression controller 221 can start to reduce the amount of packets to be processed with header compression processing and control the header compressor 200 to process packets without compressing headers of the packets.

In a first embodiment, when a level of a resource is below a threshold, the compression controller 221 can determine to process a packet without compressing a header of the packet. For example, the compression controller 221 receives resource status information 216 and detects that a level of a resource, such as battery level, is below a threshold. In order to save energy, the compression controller 221 can determine to process packets without performing header compression on the packets. For example, the compression controller 221 can transmit a control signal to the compression module 218 to pause to receive header information generated from the header parser 212. At the same time, the compression controller 221 can transmit a control signal to trigger the un-compression module 223 to process packets without header compression.

In one example, the un-compression module 223 is configured to generate an un-compression header for each packet directed to un-compression processing. The un-compression header can include information indicating that an original packet having an un-compressed header is attached to the un-compression header. For example, the un-compression header can be first stored in the un-compression header buffer 224 and subsequently combined with the respective original packet to generate an un-compressed packet.

In a second embodiment, when a level of a resource is below a threshold, the compression controller 221 can determine whether to compress a packet according to a header compression ratio of the packet. In one example, a header compression ratio of a packet is defined as the ratio of an uncompressed packet size to a compressed packet size. For example, an audio packet with an RTP/UDP/IPv4 header can have a combined header of 40 bytes (a 20-byte IPv4 header, an 8-byte UDP header, and a 12-byte RTP header) and a payload of 33 bytes. In contrast, an FTP packet with an TCP/IP header can have a combined header of 40 bytes (a 20-byte IPv4 header and a 20-byte TCP header) and a TCP message payload of 1000 bytes. Assuming ROHC is employed, a combined header can be compressed to be 1 or 3 bytes. The compression ratio of the FTP packet is far less than that of the audio packet. For another example, an audio packet with an RTP/UDP/IPv6 header can have a combined header of 60 bytes (a 40-byte IPv4 header, an 8-byte UDP header, and a 12-byte RTP header) and a payload of 33 bytes. Compared with the IPv4 audio packet, IPv6 audio packet can have a higher compression gain.

Accordingly, packet flows can be classified into different groups according to compression ratios of each packet flow. Each packet flow can be identified by using static header field information, such as source and destination host (IP) addresses, transport protocol type (e.g., UDP or TP), process (port) numbers, and the like. For example, based on static header information of a packet, the compression controller 221 can first determine a group the packet matches with. When the matched group has a compression ratio lower than a threshold, the compression controller 221 can direct the packet to un-compression processing. For example, the compression controller 221 may transmit a control signal to trigger the un-compression module 223 to process the packet. Otherwise, when the matched group has a compression ration higher that a threshold, the compression controller 221 can transmit a control signal to trigger the compression module 218 to compress the header of the packet. Alternatively, based on the header information and a payload of a packet, the compression controller 221 can estimate a compression ratio for this packet, and subsequently determine whether to compress a header of the packet based on the estimated compression ratio.

In a third embodiment, when a level of a resource is below a threshold, the compression controller 221 can determine whether to compress a packet according to header content of the packet. For example, some type of packet headers can include dynamic header fields. Changes of those dynamic header fields can be hard to predict. Thus, compression of such type of packet headers demands more computational resources. For example, an IPv6 packet header can include variable number of extension header fields, and a TCP header can have abundant options. Compression of such type of headers consumes more resources. Accordingly, when resource levels of CPU time or battery energy is low, headers demanding more resources to be compressed can be preferably selected to be processed without header compression.

In other embodiments, when a resource level is below a threshold, a combination of multiple factors can be considered to determine whether to compress a header. For example, the compression controller 221 can be configured to perform a process including two steps. In a first step, based on received header information of a packet, the compression controller 221 can first determine whether to compress the packet based on a compression ratio of the packet. When the packet has a compression ratio higher than a threshold, in a second step, the compression controller 221 can proceed to determine whether to compress the packet based on header content. In this way, granularity of control function of the compression controller 221 can be refined.

Figure 3:
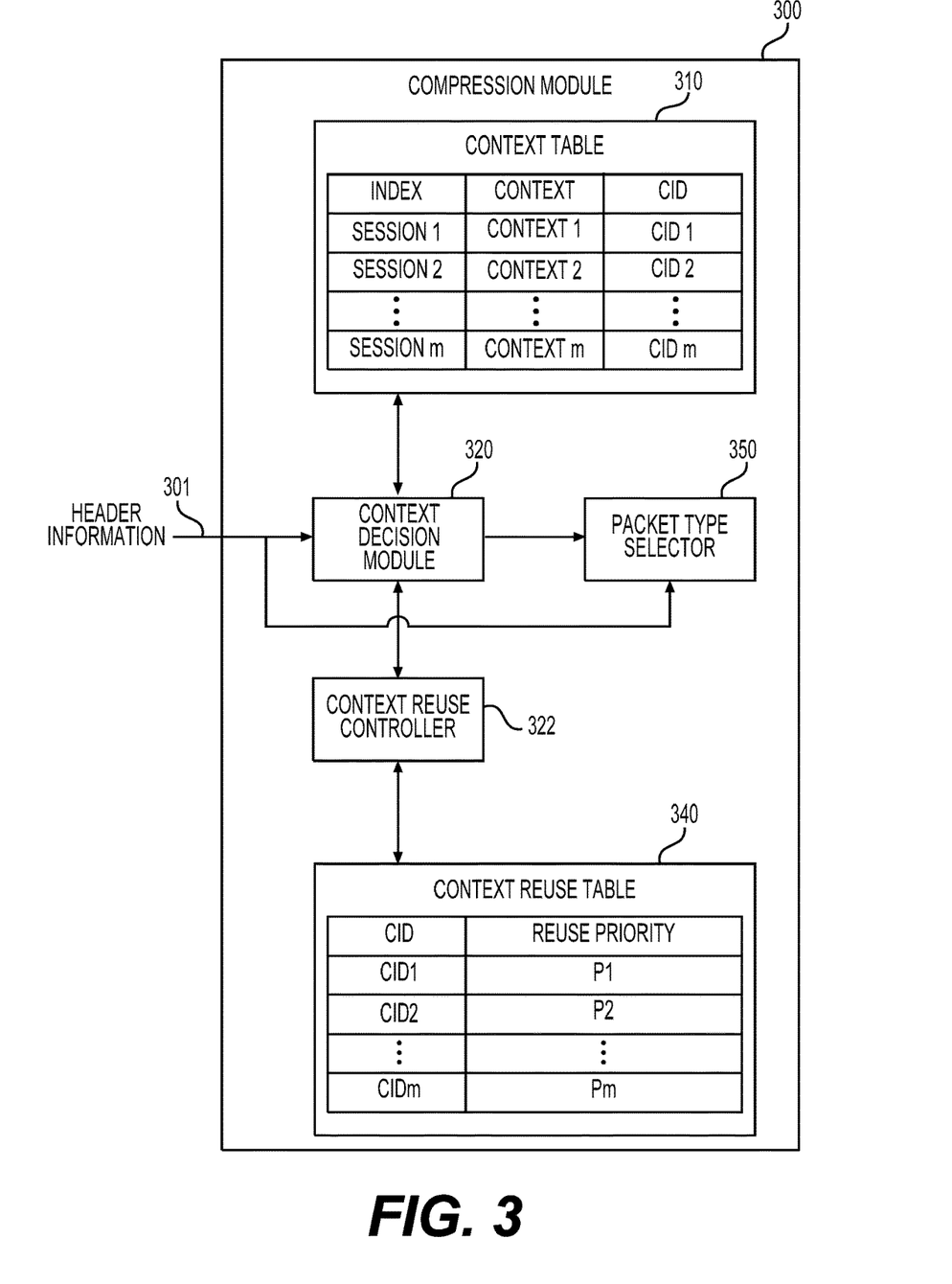
FIG. 3 shows a compression module according to an embodiment of the disclosure.

FIG. 3 shows a compression module 300 according to an embodiment of the disclosure. The compression module 300 can be an example of the compression module 218 in FIG. 2 example. The compression module 300 is configured to make a context reuse decision based on context reuse priorities associated with each established contexts. As shown, the compression module 300 includes a context table 310, a context decision module 320, a context reuse controller 322, a context reuse table 340, and a packet type selector 340.

In one example, the compression module 300 is configured to receive header information 301 from the header parser 212 in FIG. 2, and perform header compression processing based on the received header information. For example, as a response to receiving header information 301 of a header, the compression module 300 can determine a context and select a packet type, and subsequently perform header compression on the header based on the determined context and the selected packet type. In addition, in one example, the compression module 300 is under control of the compression controller 221. Triggered by a control signal indicating a decision of the compression controller 221, the compression module 300 can pause the header compression processing or conduct a header compression on a packet header.

The context table 310 is configured to store header compression contexts that have been established. In one example, the context table 310 includes multiple rows as shown in FIG. 3. Each row includes a session index, content of a context, a CID of the context. The session index can be generated based on static header field values of a header, indicating a packet flow corresponding to a session. In one example, the context table 310 is stored in a memory.

The context decision module 320 is configured to receive header information 301 of a packet generated from the header parser 212, and select a context from the context table 310 that matches the packet. For example, a session index can be determined based on the received header information. Using the determined session index, the context decision module 320 can search the context table to find a context matching the session index. The determined context can later be used for compression of the respective packet header.

When no context matching the received header information 301 is found in the context table 310, the context decision module 320 can create a context and associate a CID with the created context. Thus, the number of contexts in the context table 310 can be increased. As described above, the number of contexts that can be established is limited to a maximum number, for example, preconfigured by the base station 150 in FIG. 1 example. When the number of sessions 1-m shown in FIG. 1 is larger than the maximum number of contexts, it is possible that the amount of existing contexts can reach the maximum number limitation, and no room is available for creation of a new context. Consequently, the context decision module 320 can trigger the context reuse controller 322 to select a context from the existing contexts for context reuse. Based on a context reuse decision of the context reuse controller 322, the context decision module 320 can create a new context by using a CID of an existing context that is selected for context reuse.

The context reuse controller 322 is configured to select an existing context for context reuse. The selection can be based on a context reuse priority associated with each existing context in the context table. For example, the context reuse controller 322 can establish and maintain the context reuse table 340. The context reuse table 340 can include a list of CIDs, for example, CID1-CIDm. Each CID in the context reuse table 340 corresponds to an established context in the context table 310, and is associated with a reuse priority P1-Pn. A CID with the highest reuse priority can be selected for the context reuse. In one example, the context table 310 and the context reuse table 340 is combined into a single table.

In order to maintain the context reuse table 340, the context reuse controller 322 is configured to assign a context reuse priority to a context when the context is created in the context table 310. In one example, the context reuse controller 322 determines a context reuse priority for a newly established context according to the following factors: traffic pattern of a packet flow corresponding to the context, header content of the packet flow corresponding to the context, and compression ratio of the packet flow corresponding to the context.

Regarding the traffic pattern factor, in one example, a packet flow with a long time interval between successive packets is given a low priority to be reused in order to avoid frequent context reuse taking place. For example, an audio stream can include packets generated from an audio application (e.g., audio encoder) with an interval of 20 ms between two consecutive audio packets. Accordingly, in one example, when header information of an audio packet is received, the context reuse controller 322 recognizes the audio packet, for example, based on header information of the audio packet, and assigns a lower priority than other types of packets to a context created for the audio packet. In this way, during an audio session, the respective context will not be reused even the context becomes the oldest one among all the contexts.

Regarding the header content factor, in one example, a packet flow with header content requiring more computation resources to compress than other type of packets is given a high priority to be reused in order to save computation resources. Examples of packets requiring more compression efforts can include IPv6 packets and TCP packets. An IPv6 packet header can include multiple extension header fields. A TCP packet header can include header fields having multiple options. Both the IPv6 packets and TCP packets can require more computation resources than other type of packets for header compression processing. Accordingly, in one example, when an IPv6 packet or TCP packet is received, the context reuse controller 322 recognizes the packet based on header information, and assigns a higher reuse priority than other type of packets to a context created for the packet. Accordingly, a context corresponding to an IPv6 packet or TCP packet has a higher probability to be selected for context reuse.

Regarding the compression ratio factor, in one example, packet flows with a higher compression ratio are assigned with lower reuse priorities to be reused than packet flows with a lower compression ratio. For example, an audio packet flow may have a higher compression ratio than a FTP packet flow. Thus, in one example, the audio packet flow is assigned with a lower reuse priority, while the FTP packet flow is assigned with a higher priority. When performing context reuse, a context of the FTP packet flow has more chance to be reused than that of the audio packet flow.

In one example, the context reuse controller 322 directs a packet to un-compression header processing to avoid ping-pong context replacement during a context reuse process. For example, at an initial stage of the context reuse process, the context reuse controller 322 can first determine a reuse priority for the packet, for example, based on one or more factors of the traffic pattern, header content, or compression ratio. Then, the context reuse controller 322 can compare the obtained reuse priority with a highest priority in the context reuse table. When the obtained reuse priority is higher than the highest priority, meaning a context of the packet under consideration has a higher chance to be reused, the context reuse controller 322 can determine to process a header of the packet without header compression. For example, the context reuse controller 322 may transmit a control signal to the un-compression module 223 in FIG. 2, causing the un-compression module 223 to process the packet.

The packet type selector 350 is configured to select a packet type for header compression processing. The selection can be based on results of the context decision module 320 and header information 301. In one example, the compression module 300 implements the ROHC scheme. Accordingly, the compression module 300 can operate on one of three states for compression of headers belonging to a packet flow and generate compressed headers having a format corresponding to one of the three states. Specifically, for a packet flow, the compression module 300 starts at a first state. In the first state, no context is established for the packet flow, and there is no agreement on compressing the packet flow between compressor and decompressor. The compression module 300 may generate a header in a format including all packet header information. Based on such a header, the decompressor can accordingly establish a context including static header information at the decompressor side.

In a second state, the static part of the context is regarded as established between the compressor and the decompressor, whereas a dynamic part of the context is not. The compressor module 300 generates compressed headers including dynamic part of header information but without static part of header information. In a third state, both the static and dynamic parts of the context are established at the compressor and decompressor. The compression module 300 generates a compressed header including minimal information such as a sequence number of the compressed header but without static or dynamic part of header information. Accordingly, for packets of a packet flow under processing, a compressed header corresponding to the third state has the smallest size, while a header corresponding to the first state has the largest size, and a compressed header corresponding to the second state has an intermediate size.

In one example, the packet type selector 350 determines a format of a to-be-compressed header according to results of the context decision module 320. For example, when a context is newly established for a header at the context decision module 320, the packet type selector 350 accordingly selects a compressed header format corresponding to the first state. When an established context is selected for a header at the context decision module 320, the packet type selector 350 can obtain previous state information corresponding to a OD of the selected context, and select a state the same as the previous one. In addition, when a previous state is the third state, the packet type selector 350 can select the second state when a variation of a change pattern of a dynamic header field is detected.

Frequent context reuse leads to low compression efficiency. When context reuse takes place, a new context is established at a compressor, which causes the compression module 300 to operate on the first state for the respective packet flow for a period of time until a context is established in a decompressor. Conventional context reuse is based on existing time of established contexts, and may lead to ping-pong reuse replacement. In contrast, conducting context reuse based on reuse priorities can reduce context reuse frequency, leading to a higher compression performance.

In various examples, the header compressor 120 in FIG. 1, the header compressor 200 in FIG. 2, and the compression module 300 can be implemented with hardware, software, or combination thereof. In one example, those components 120, 200, and 300 are implemented with one or more integrated circuits (ICs), such as an application specific integrated circuit (ASIC), field programmable gate array (FPGA), and the like. In another example, functions of those components 120, 200, and 300 are implemented with software or firmware including instructions stored in a computer-readable non-volatile storage medium. The instructions, when executed by a processing circuit, causing the processing circuit to perform the respective functions. The computer-readable non-volatile storage medium and the processing circuit can be included in the mobile device 110.

Figure 4:
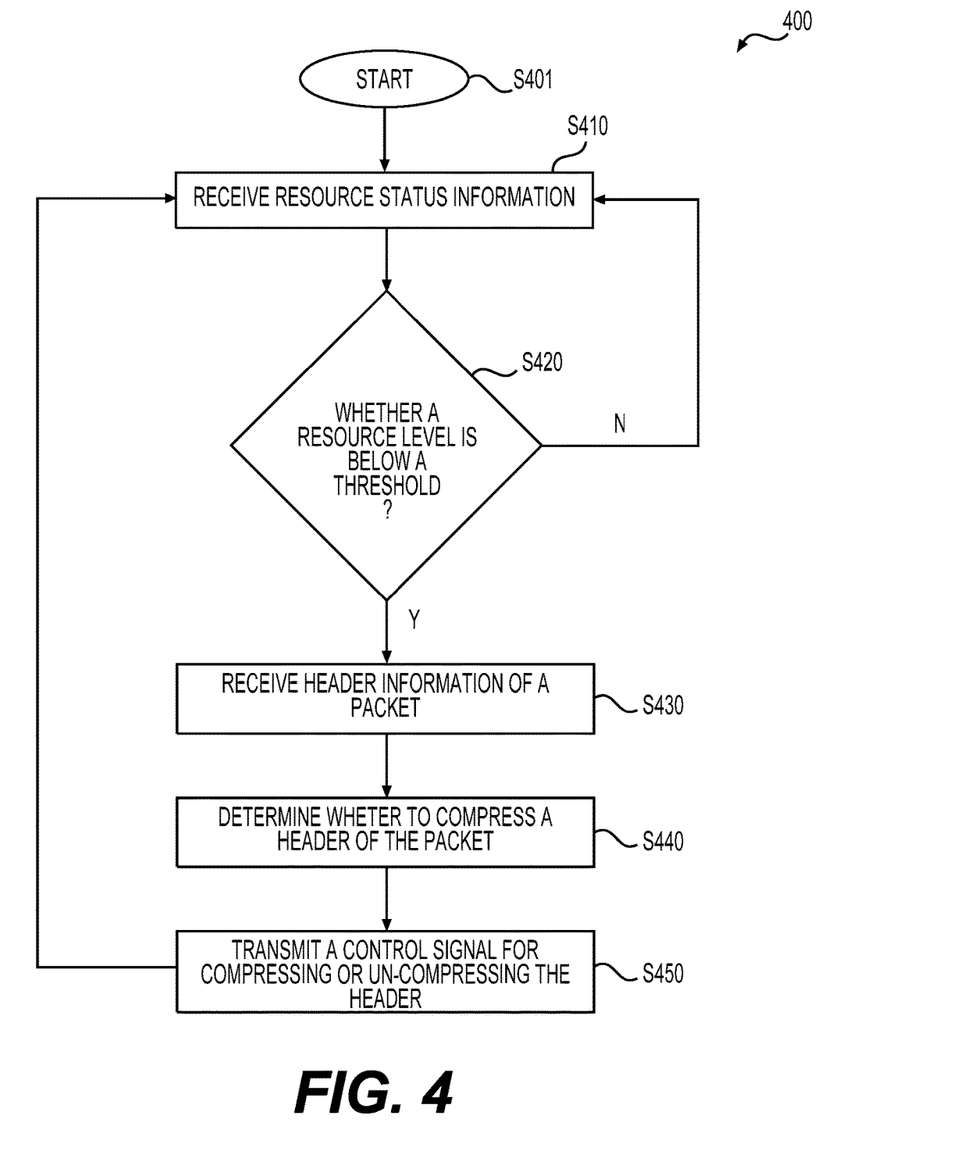
FIG. 4 shows a process for controlling an amount of to-be-compressed headers at a header compressor according to an embodiment of the disclosure.

FIG. 4 shows a process 400 for controlling an amount of to-be-compressed headers at a header compressor according to an embodiment of the disclosure. During the process 400, a header of a packet is determined whether to be compressed based on a resource level. Further, when a resource level is below a threshold, the header is determined whether to be compressed based on a compression ratio or header content of the packet. The process 400 can be performed at the compression controller 221 in the header compressor 200 in FIG. 2 example. The process 400 starts at S401 and proceeds to S410.

At S410, resource status information can be received. For example, the resource status information can include status of resources used for header compression, such as CPU time, memory, and battery energy.

At S420, whether a resource level is below a threshold is determined. When a resource level is below a threshold, the process 400 proceeds to S430. Otherwise, the process 400 proceeds to S410.

At S430, header information of a packet can be received.

At S440, whether to compress a header of the packet is determined. In one example, it is determined not to compress the header without consideration of other factors. For example, when battery level is below a threshold, all packet headers are processed without compression processing in order to save power, ignoring status of the memory resources or CPU time. In one example, whether to compress the header is determined based on a compression ratio of the packet, or header content of the packet. For example, when the compression ratio of the packet is below a threshold, or compression of the packet needs intensive computation resources, it can be determined not to compress the header.

At S450, a control signal for compressing or un-compressing the header can be transmitted according to decision of S440. For example, to compress the header, the control signal can be transmitted to a header compression module to trigger header compression processing on the header. Otherwise, to process the packet without compression of the packet, a control signal can be transmitted to an un-compression module. A un-compression header can be generated. The process 400 then returns to S410.

Figure 5:
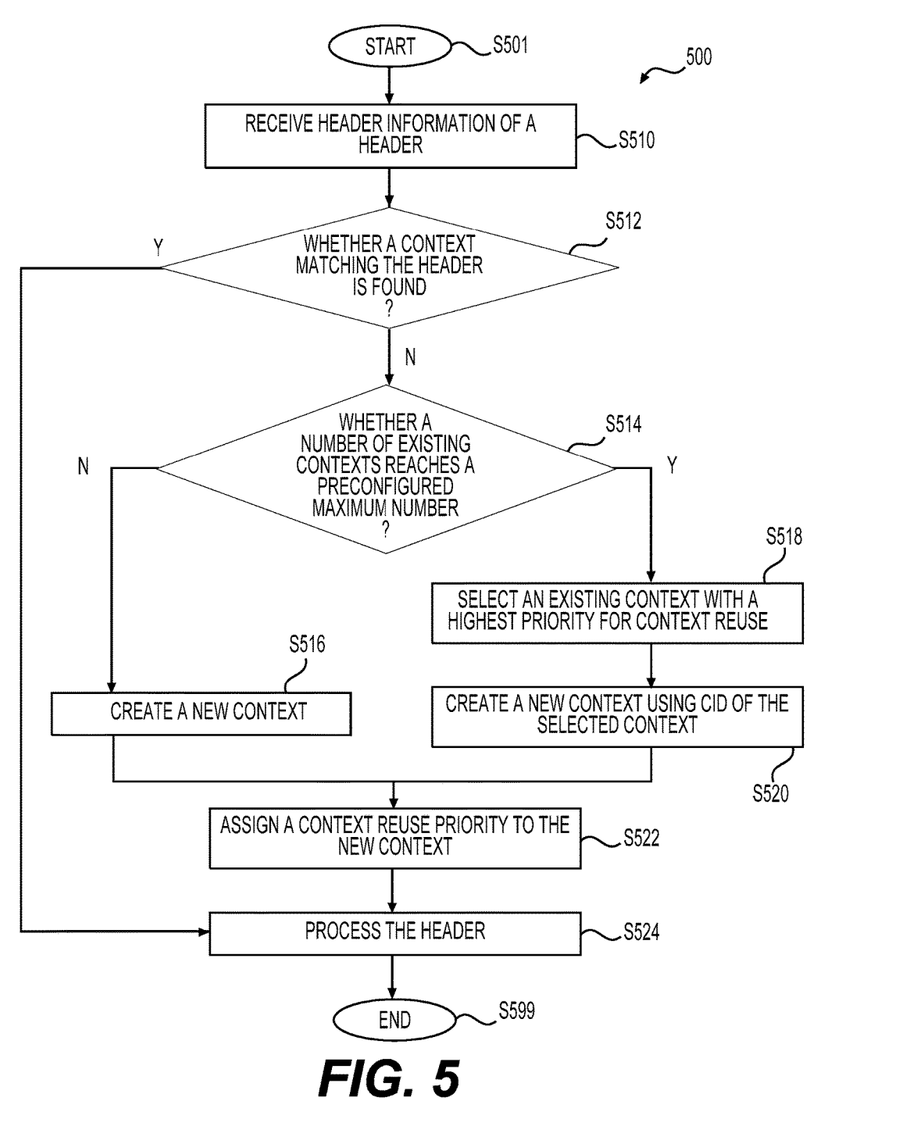
FIG. 5 shows a context reuse process for header compression according to an embodiment of the disclosure.

FIG. 5 shows a context reuse process 500 for header compression according to an embodiment of the disclosure. The context reuse process 500 can be performed at the compression module 218 in FIG. 2 example, or the compression module 300 in FIG. 3 example. The process 500 starts from S501 and proceeds to S510.

At S510, header information of a header can be received from a header parser. In one example, the parsed header information can be stored in a buffer.

At S512, whether a context matching the header is found is determined. For example, established contexts can be included in a context table and each associated with a context reuse priority. Based on static field vales in the header information, a search can be conducted to find a context matching the header. When a context matching the header is found, the process 500 proceeds to S524. Otherwise, the process 500 proceeds to S514.

At S514, whether a number of existing contexts in the context table reaches a preconfigured maximum number of contexts can be determined. When the maximum number has been reached, the process 500 proceeds to S518. Otherwise, the process proceeds to S516.

At S516, a new context can be created in the context table.

At S518, an existing context with a highest context reuse priority can be selected for context reuse. At S520, a new context can be selected using CID of the existing context selected at S518.

At S522, a context reuse priority can be assigned to the new context created either at S516 or S520. At S524, the header is processed based on a context selected from the existing contexts or the newly created context. The process proceeds to S599 and terminates at S599.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for packet header compression, comprising:
   receiving a packet in a communication device having resources for packet compression;
   parsing a header of the packet to obtain header information;
   processing the packet with header compression when a level of a resource available for packet compression in the communication device is above a threshold; and
   determining whether to compress the header of the packet based on the header information when the level of the resource available for packet compression in the communication device is below the threshold.

2. The method of claim 1, further comprising:
processing the packet without header compression when the level of the resource available for packet compression is below the threshold.

3. The method of claim 1, wherein determining whether to compress the header of the packet includes:
determining whether to compress the header of the packet based on number of dynamic header fields of the header when the level of the resource available for packet compression is below the threshold.

4. The method of claim 1, further comprising:
compressing the header of the packet when the level of the resource available for packet compression is below the threshold, and a packet compression ratio of the packet is above a threshold.

5. The method of claim 1, wherein the resource available for packet compression in the communication device is one of central processing unit (CPU) time of a CPU, memory for storage of compressed headers, or battery energy.

6. The method of claim 1, further comprising:
assigning a context reuse priority to a compression context established for the packet.

7. The method of claim 6, wherein the reuse priority assigned to the compression context is determined based on a traffic pattern, header content, or a packet compression ratio of a packet flow including the packet.

8. The method of claim 1, further comprising:
selecting an existing compression context for context reuse for the packet based on context reuse priorities assigned to existing compression contexts.

9. The method of claim 1, further comprising:
determining a context reuse priority for the packet; and
when the context reuse priority of the packet is higher than context reuse priorities of existing compression contexts, processing the packet without header compression.

10. A communication device, comprising circuitry configured to:
receive a packet;
parse a header of the packet to obtain header information;
process the packet with header compression when a level of a resource available for packet compression in the communication device is above a threshold; and
determine whether to compress the header of the packet based on the header information when the level of the resource available for packet compression in the communication device is below the threshold.

11. The communication device of claim 10, wherein the circuitry is further configured to:
process the packet without header compression when the level of the resource available for packet compression is below the threshold.

12. The communication device of claim 10, wherein the circuitry is further configured to:
determine whether to compress the header of the packet based on number of dynamic header fields of the header when the level of the resource available for packet compression is below the threshold.

13. The communication device of claim 10, wherein the circuitry is further configured to:
compress the header of the packet when the level of the resource available for packet compression is below the threshold, and a packet compression ratio of the packet is above a threshold.

14. The communication device of claim 10, wherein the resource available for packet compression in the communication device is one of central processing unit (CPU) time of a CPU, memory for storage of compressed headers, or battery energy.

15. The communication device of claim 10, wherein the circuitry is further configured to:
assign a context reuse priority to a compression context established for the packet.

16. The communication device of claim 15, wherein the reuse priority assigned to the compression context is determined based on a traffic pattern, header content, or a packet compression ratio of a packet flow including the packet.

17. The communication device of claim 10, wherein the circuitry is further configured to:
select an existing compression context for context reuse for the packet based on context reuse priorities assigned to existing compression contexts.

18. The communication device of claim 10, wherein the circuitry is further configured to:
determine a context reuse priority for the packet; and
when the context reuse priority of the packet is higher than context reuse priorities of existing compression contexts, process the packet without header compression.

19. A non-transitory computer readable medium having computer readable instructions stored thereon which, when executed by a processing circuit, cause the processing circuit to perform a method, the method comprising:
receiving a packet in a communication device having resources for packet compression;
parsing a header of the packet to obtain header information;
processing the packet with header compression when a level of a resource available for packet compression in the communication device is above a threshold; and
determining whether to compress the header of the packet based on the header information when the level of the resource available for packet compression in the communication device is below the threshold.

20. The non-transitory computer readable medium of claim 19, wherein the method further comprises:
processing the packet without header compression when the level of the resource available for packet compression is below the threshold.

* * * * *